(12) United States Patent
Ovshinsky

(10) Patent No.: US 6,875,536 B2
(45) Date of Patent: Apr. 5, 2005

(54) CATALYTIC HYDROGEN STORAGE COMPOSITE MATERIAL AND FUEL CELL EMPLOYING SAME

(75) Inventor: Stanford R. Ovshinsky, Bloomfield Hills, MI (US)

(73) Assignee: Texaco Ovonic Fuel Cell LLC, Rochester Hills, MI (US)

( * ) Notice: Subject to any disclaimer, the term of this patent is extended or adjusted under 35 U.S.C. 154(b) by 356 days.

(21) Appl. No.: 10/217,353

(22) Filed: Aug. 12, 2002

(65) Prior Publication Data

US 2003/0129476 A1 Jul. 10, 2003

Related U.S. Application Data

(63) Continuation-in-part of application No. 09/687,717, filed on Oct. 13, 2000, now Pat. No. 6,492,056.

(51) Int. Cl.[7] ............................. H01M 4/86; C01B 6/24
(52) U.S. Cl. ............................. 429/40; 429/44; 429/12; 429/218.2; 429/231.8; 429/231.5; 429/221; 429/224; 429/220; 429/223; 429/241; 429/242; 429/233; 420/900
(58) Field of Search ............................. 429/40, 44, 12, 429/218.2, 231.8, 231.5, 221, 224, 220, 223, 241, 242, 233; 420/900

(56) References Cited

U.S. PATENT DOCUMENTS 5,536,591 A * 7/1996 Fetcenko et al. ............. 429/59
5,599,640 A * 2/1997 Lee et al. ..................... 429/46

* cited by examiner

*Primary Examiner*—Patrick Ryan
*Assistant Examiner*—Angela J. Martin
(74) *Attorney, Agent, or Firm*—Frederick W. Mau, II; David W. Schumaker; Marvin S. Siskind (57) ABSTRACT

A composite hydrogen storage material including 1) an active material having hydrogen storage capacity; and 2) a catalytic material having greater catalytic activity toward the dissociation of molecular hydrogen and/or oxidation of hydrogen than that of said active material having hydrogen storage capacity. Also, a fuel cell employing anodes formed from the composite hydrogen storage material. The fuel cell has the ability to start up instantly and can accept recaptured energy such as that of regenerative braking by operating in reverse as an electrolyzer.

61 Claims, 4 Drawing Sheets

CATALYTIC HYDROGEN STORAGE COMPOSITE MATERIAL AND FUEL CELL EMPLOYING SAME

RELATED APPLICATIONS

The present invention is a continuation-in-part of U.S. patent application Ser. No. 09/687,717, which is assigned to the same assignee as the current application, entitled "Catalytic Hydrogen Storage Composite Material And Fuel Cell Employing Same", filed Oct. 13, 2000 now U.S. Pat. No. 6,492,056, the disclosure of which is hereby incorporated by reference.

FIELD OF THE INVENTION

The instant invention relates composite hydrogen storage materials including 1) hydrogen storage materials and 2) additional catalytic materials. The catalytic materials of the instant invention are based on a disordered non-equilibrium material designed to have fast kinetics, high density of catalytically active sites, resistance to poisoning, and long operating life. The instant composite material is not only useful for hydrogen storage, but is also useful as the anode materials for fuel cells and more specifically to Ovonic instant startup fuel cells.

BACKGROUND OF THE INVENTION

The instant application discloses hydrogen storage materials and fuel cells that overcome the major deterrents to the widespread utilization of such. Namely, the instant inventors have solved the major barriers present in modern hydrogen storage and fuel cell technology, using materials which contain no costly noble metals therein. These barriers include: hydrogen storage capabilities, requisite catalytic activity, ionic conductivity, corrosion resistance, and increased resistance toward the poisoning effect of different gases. Additionally these materials must be low cost, containing no noble metals, so that fuel cells can be widely utilized. The anodes that are present in the fuel cells have catalytic material and hydrogen storage material (allowing for instant startup) using active materials which contain no noble metals. The fuel cells are capable of instantaneous startup and can store recaptured energy from processes such as regenerative braking. The materials are robust and poison resistant. The electrodes are easy to produce, by proven low cost production techniques, such as those presently employed in the production of Ovonic Ni-MH batteries. Carbon is eliminated from the anode, where in the prior art it tends to be oxidized to carbon dioxide, thus helping to eliminating the carbonate poisoning of the fuel cell electrolyte. The hydrogen storage materials of the anode are dense enough to block carbon dioxide from entering the electrolyte via the hydrogen fuel stream, but allow hydrogen to pass, acting as a hydrogen pump. The instant fuel cells have increased efficiency and power availability (higher voltage and current) and a dramatic improvement in operating temperature range (from −20 to 150° C.) The fuel cell system of the instant invention allows for widespread utilization of fuel cells in all sectors of the energy production/consumption market, thereby further fostering the realization of a hydrogen based economy. An infrastructure for such a hydrogen based economy is disclosed in U.S. application Ser. No. 09/444,810, entitled "A Hydrogen-based Ecosystem" filed on Nov. 22, 1999 for Ovshinsky, et al. (the '810 application), which is hereby incorporated by reference. This infrastructure, in turn, is made possible by hydrogen storage alloys that have surmounted the chemical, physical, electronic and catalytic barriers that have heretofore been considered insoluble. These alloys are fully described in copending U.S. patent application Ser. No. 09/435,497, entitled "High Storage Capacity Alloys Enabling a Hydrogen-based Ecosystem", filed on Nov. 6, 1999 for Ovshinsky et al. (the '497 application), which is hereby incorporated by reference.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see the '810 and '497 applications), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications). For instance, a truck carrying 15 tons of hydride material, will contain 1050 Kg (assuming 7 wt % storage) of hydrogen, which is 412,000 standard cubic feet of hydrogen. This is enough fuel to supply 175 cars at 6 Kg/car. Assuming 1 ton of hydride occupies a volume of 1 cubic meter, and adding an additional 33% volume for cooling, the truck to carry the material will need to be about 20,000 liters in volume.

A fuel cell is an energy-conversion device that directly converts the energy of a supplied gas into an electric energy.

Researchers have been actively studying fuel cells to utilize the fuel cell's potential high energy-generation efficiency. The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds top the cost thereof. The proton exchange membrane itself is quite expensive, and because of it's low conductivity at temperatures below 80° C., inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuels cells in that they have higher operating efficiencies, they use less expensive materials of construction, and they have no need for expensive membranes. The alkaline fuel cell also has relatively higher ionic conductivity in the electrolyte, therefore it has a much higher power capability. While the conventional alkaline fuel cell is less sensitive to temperature than the PEM fuel cell, the platinum active materials of conventional alkaline fuel cell electrodes become very inefficient at low temperatures. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. The conventional alkaline fuel cell is also susceptible to the formation of carbonates from $CO_2$ produced by oxidation of the anode carbon substrates or introduced via impurities in the fuel and air used at the electrodes. This carbonate formation clogs the electrolyte/electrode surface and reduces/eliminates the activity thereof. The invention described herein eliminates this problem from the anode.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the anode for hydrogen oxidation and the cathode for oxygen reduction, both being positioned in a cell containing an electrolyte (such as an alkaline electrolytic solution). Typically, the reactants, such as hydrogen and oxygen, are respectively fed through a porous anode and cathode and brought into surface contact with the electrolytic solution. The particular materials utilized for the cathode and anode are important since they must act as efficient catalysts for the reactions taking place.

In an alkaline fuel cell, the reaction at the anode occurs between the hydrogen fuel and hydroxyl ions ($OH^-$) present in the electrolyte, which react to form water and release electrons:

$$H_2 + 2OH^- \rightarrow 2H_2O + 2e^-.$$

At the cathode, the oxygen, water, and electrons react in the presence of the cathode catalyst to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the anode and cathode.

It should be noted that the anode catalyst of the alkaline fuel cell is required to do more than catalyze the reaction of $H^+$ ions with $OH^-$ ions to produce water. Initially the anode must catalyze and accelerate the formation of $H^+$ ions and $e^-$ from $H_2$. This occurs via formation of atomic hydrogen from molecular hydrogen. The overall reaction can be seen as (where M is the catalyst):

$$M + H_2 \rightarrow 2MH \rightarrow M + 2H^+ + 2e^-.$$

Thus the anode catalyst must not only efficiently catalyze the formation of water at the electrolyte interface but must also efficiently dissociate molecular hydrogen into ionic hydrogen. Using conventional anode material, the dissociated hydrogen is transitional and the hydrogen atoms can easily recombine to form hydrogen if they are not used very quickly in the oxidation reaction. Withe the hydrogen storage anode materials of the inventive instant startup fuel cells, hydrogen is trapped in hydride form as soon as they are created, and then are used as needed to provide power.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell anode catalyst is platinum. Platinum, despite its good catalytic properties, is not very suitable for wide scale commercial use as a catalyst for fuel cell anodes, because of its very high cost. Also, noble metal catalysts like platinum, also cannot withstand contamination by impurities normally contained in the hydrogen fuel stream. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become blackened and inactivated by poisonous species invariably contained in the fuel cell. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. In addition, the decrease in catalytic activity results in increased over-voltage at the anode and hence the cell is much less efficient adding significantly to the operating costs. Over-voltage is the difference between the electrode potential and it's equilibrium value, the physical meaning of over-voltage is the voltage required to overcome the resistance to the passage of current at the surface of the anode (charge transfer resistance). The over-voltage represents an undesirable energy loss which adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One attempt at improving the electrode material for fuel cells is embodied in U.S. Pat. No. 5,795,669 to Wilkinson, et al. Therein is disclosed a composite electrode material including two catalyst materials. One of the materials contains an active gas phase catalyst, and the other material contains an active electrochemical catalyst. Unfortunately, none of the described materials store hydrogen, and as such, are not useful as a built in initialization supply of hydrogen for the fuel cell.

Until now no one but Ovshinsky (in U.S. Pat. No. 4,487,818, the disclosure of which is incorporated herein by reference) has employed the Ovshinsky principles of atomic engineering to tailor materials which uniquely and dramatically advance the fuel cell art. Specifically there is a need for materials which allow fuel cells to operate in a wide range of temperatures that such a fuel cell will be exposed to under ordinary consumer use. There is also a need for materials which allow the fuel cell to be run in reverse as an electrolyzer to utilize/store recaptured energy. Finally there is a need in the art for materials which allow the fuel cell to startup instantaneously by providing an internal source of fuel. One of the needed materials is an inexpensive hydrogen storage anode material which is highly catalytic to the dissociation of molecular hydrogen and the formation of water from hydrogen and hydroxyl ions as well as being corrosion resistant to the electrolyte, resistant to contaminant poisoning from the reactant stream and capable of working in a wide temperature range. Also needed is a non-noble metal catalytic material to be used in conjunction with the hydrogen storage materials of the instant invention to enhance the dissociation of hydrogen and the oxidation of hydrogen.

SUMMARY OF THE INVENTION

The object of the instant invention is a hydrogen storage composite material which employs both: 1) a hydrogen storage alloy which has excellent catalytic activity for the formation of atomic hydrogen from molecular hydrogen, outstanding catalytic activity toward the formation of water from hydrogen ions and hydroxyl ions, and has exceptional corrosion resistance toward the alkaline electrolyte of an alkaline fuel cell; as well as 2) an additional catalytic material which enhances the dissociation of molecular hydrogen into atomic hydrogen and/or the formation of water molecules from hydrogen ions and hydroxyl ions.

The catalytic materials are formed from non-equilibrium metastable highly disordered materials formed by modification techniques. The technique of modification to provide a non-equilibrium material having a high degree of disorder provides unique bonding configurations, orbital overlap and hence a spectrum of catalytically active sites for the hydrogen oxidation reaction. The modification technique involves tailoring of the local structural and chemical order of the materials of the present invention and is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity is accomplished by manipulating the local chemical order and hence the local structural order by the incorporation of selected modifier elements into a selected host matrix to create the desired disordered material. The disordered multicomponent materials may be amorphous, polycrystalline (but lacking long range order) or microcrystalline in structure, or an intimate mixture of amorphous and polycrystalline or microcrystalline phases.

The tailor-made materials include a host matrix including at least one transition element, and at least one modifier element introduced into the host matrix in a non-equilibrium manner. The incorporation of the modifier element or elements in this manner provides the desired disordered structure of the material and creates numerous local structural and chemical environments which act as catalytically active sites for the hydrogen oxidation reaction in a fuel cell anode. Nickel is an example of a transition element particularly suitable for forming the host matrix. A few examples of the preferred modifier elements include transition elements such as Ti, V, Mo, and Zr and other elements such as Mg, Si, or Al. The most useful alloys are the Ni—Ti—Mo alloys.

A second object of the instant invention is the use of the composite hydrogen storage materials as the anode material of a fuel cell which has the ability to start up instantly and can accept recaptured energy such as that of regenerative braking by operating in reverse as an electrolyzer. The instant startup fuel cells have increased efficiency and power availability (higher voltage and current) and a dramatic improvement in operating temperature range (−20 to 150° C.) The fuel cell employs a composite anode active material which includes materials with hydrogen storage capacity and non-storage catalytically active materials. The anode material is low cost, containing no noble metals. The anode materials are robust and poison resistant. The anode materials are is easy to produce, by proven low cost production techniques. The anode eliminates the use of carbon therein, thus helping to eliminating the carbonate poisoning of the fuel cell.

The hydrogen storage alloys useful in the anodes of the instant startup fuel cells reversibly absorb and release hydrogen and have a fast hydrogenation reaction rate and a long shelf-life. The hydrogen storage alloy is preferably selected from Rare-earth/Misch metal alloys, zirconium alloys, titanium alloys and mixtures or alloys thereof. The preferred hydrogen storage alloy contains enriched catalytic nickel regions distributed throughout the oxide surface of the particulate thereof. The catalytic nickel regions are 50–70 Angstroms in diameter and vary in proximity from 2–300 Angstroms (preferably from 50–100 Angstroms). An example of such an alloy has the following composition:

(Base Alloy) $_a Co_b Mn_c Fe_d Sn_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

DETAILED DESCRIPTION OF THE INVENTION

The present invention relates to hydrogen storage composite material which employs both: 1) a hydrogen storage alloy which has excellent catalytic activity for the formation of atomic hydrogen from molecular hydrogen, outstanding catalytic activity toward the formation of water from hydrogen ions and hydroxyl ions, and has exceptional corrosion resistance toward the alkaline electrolyte of an alkaline fuel cell; as well as 2) an additional catalytic material which enhances the dissociation of molecular hydrogen into atomic hydrogen and/or the formation of water molecules from hydrogen ions and hydroxyl ions. Such a composite material is especially useful as the anode material for a high-powered, instant start-up fuel cell.

In addition to the hydrogen storage material, the composite materials of the instant invention include a catalytic material. This material need not be capable of storing hydrogen, but will be catalytically active toward the dissociation of molecular hydrogen into atomic hydrogen and/or catalytic toward the formation of water from hydrogen and hydroxyl ions. These materials are based upon a unique approach to catalysis. This approach involves the design of multicomponent disordered materials having tailor-made local structural chemical environments which yield desirable catalytic characteristics. The anodes are designed to have a high density of active sites, resistance to poisoning, and long operating life to provide efficient low cost fuel cell operation. The manipulation of local structural and chemical environments to provide catalytically active sites is made possible by utilization of a host matrix which is, in accordance with the present invention, structurally modified with at least one modifier element to create a spectrum of bonding arrangements to provide a greatly increased density of catalytically active sites. With a greater density of catalytically active sites, the hydrogen dissociation and/or oxidation reactions occur much more readily to allow more efficient reaction and hence reduce operating costs of, for instance, a fuel cell.

The increased number of catalytically active sites not only increases the energy output for a given amount of hydrogen, but enables the materials to be more resistant to poisoning. This is because with the catalytic materials of the present invention a certain number of catalytically active sites can be sacrificed to the effects of poisonous species while a large number of unpoisoned sites still remain to provide the desired catalysis. Also, some of the poisons are inactivated by being bonded to other sites without effecting the active sites.

The disordered catalytic materials of the present invention, unlike the specific and rigid structure of crystalline materials, are ideally suited for manipulation since they are not constrained by the symmetry of a crystalline lattice or by stoichiometry. By moving away from materials having restrictive crystalline symmetry it is possible by selectively modifying in accordance with the present invention to accomplish a significant alteration of the local structural chemical environments involved in hydrogen oxidation to enhance the catalytic properties of the anode materials. The disordered materials of the present invention can be modified in a substantially continuous range of varying percentages of modifier elements. This ability allows the host matrix to be manipulated by the modifier elements to tailor-make or engineer materials with suitable catalytic characteristics. This is in contrast to crystalline materials which generally have a very limited range of stoichiometry available and thus a continuous range of control of chemical and structural modification of such crystalline materials is not possible.

In the disordered catalytic materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites.

The disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites.

A major advantage of the disordered materials of the present invention is that they can be tailor-made to provide a very high density and variety of catalytically active sites relative to the materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

Modification of the host matrix element or elements to form the catalytic materials of the present invention can be accomplished by a variety of methods. One type of formation involves vacuum deposition techniques, (i.e., sputtering, vapor deposition or plasma deposition). With these techniques the catalytically active material of the present invention can be directly applied to the electrode surface. In these methods, the host matrix element or elements are co-deposited along with the modifier element or elements to form a layer of catalytic material on one or more surfaces of the hydrogen storage material of the electrode.

In addition to depositing the disordered catalytic material of the instant invention on one or more surfaces of the hydrogen storage material, the catalytic material may also be continually graded from a high concentration on the surface of the composite to a lower concentration inward of the bulk of the composite. As such, the concentration of the catalytic material may continually decrease without variation from the surface of the bulk of the composite to a position inward of the bulk of the composite. Also, the catalytic material may be continually graded or layered within the bulk of the composite. The thickness of this layering or grading may be anywhere from as thin as 30 or less Angstroms to as thick as 2 microns or more, depending upon the catalytic activity of the chosen material and the requirements of the end use (i.e. such as a fuel cell).

Alternative to depositing layers or continual grading on the surface of or within the bulk of the composite, the catalytic materials of the instant invention can be deposited onto the surface of the hydrogen storage alloy particles of the composite. This affords an even higher degree of catalytic activity throughout the entire bulk of the composite. In this case the materials can be deposited very thin onto the storage particles. In fact the coating on the storage particles does not even need to be completely continuous, and can be discontinuous coating segments on the particle surface, as long as the requisite catalytic function is served. The coatings can range from 20 to 150 Angstroms or so, depending, once again, upon the catalytic activity of the chosen material and the requirements of the final use.

The catalytic material of the instant invention is preferably a compositionally disordered non-equilibrium, multicomponent, catalytic material, which includes a host matrix having least one transition element and incorporating at least one modifier element. The host materix preferably includes nickel and the modifier element is preferably a transition element selected from the group consisting of Ti, Zr, Mo, V, Mg, Si and Al. The most preferred material is a Ni—Ti—Mo alloy such as those disclosed in U.S. Pat. No. 4,487,818 to Ovshinsky et al.

The instant composite materials are useful in fuel cells in general and more specifically to Ovonic instant start alkaline fuel cells. The Ovonic fuel cells have a built in reserve of hydrogen (within the storage anode) for instant startup (discussed herein below), and have the ability to accept the energy of regenerative braking by acting as an electrolyzer (discussed herein below). The fuel cell has increased efficiency and increased power capabilities as compared with conventional fuel cells of the prior art, while dramatically increasing the operating temperature range of the cell (−20 to 150° C.) The fuel cell is easy to assemble and has the advantage of utilizing proven, low cost production techniques.

The present invention also relates to fuel cell anodes and cathodes, and an energy supply system incorporating the present fuel cell. The fuel cell anode includes materials which have inherent catalytic activity as well as hydrogen storage capacity. The cathode and anode materials do not include any noble metals, and are therefore inherently low cost. The cathode and anode materials are robust and long-lived, being poisoning resistant. The anode does not utilize the carbon substrates of the prior art. While a detailed discussion of the instant electrodes and their utilization in an alkaline fuel cell is described herein below, it should be noted that the concepts of the instant invention can be applied to other types of fuel cells, such as P.E.M. fuel cells.

Figure 1:
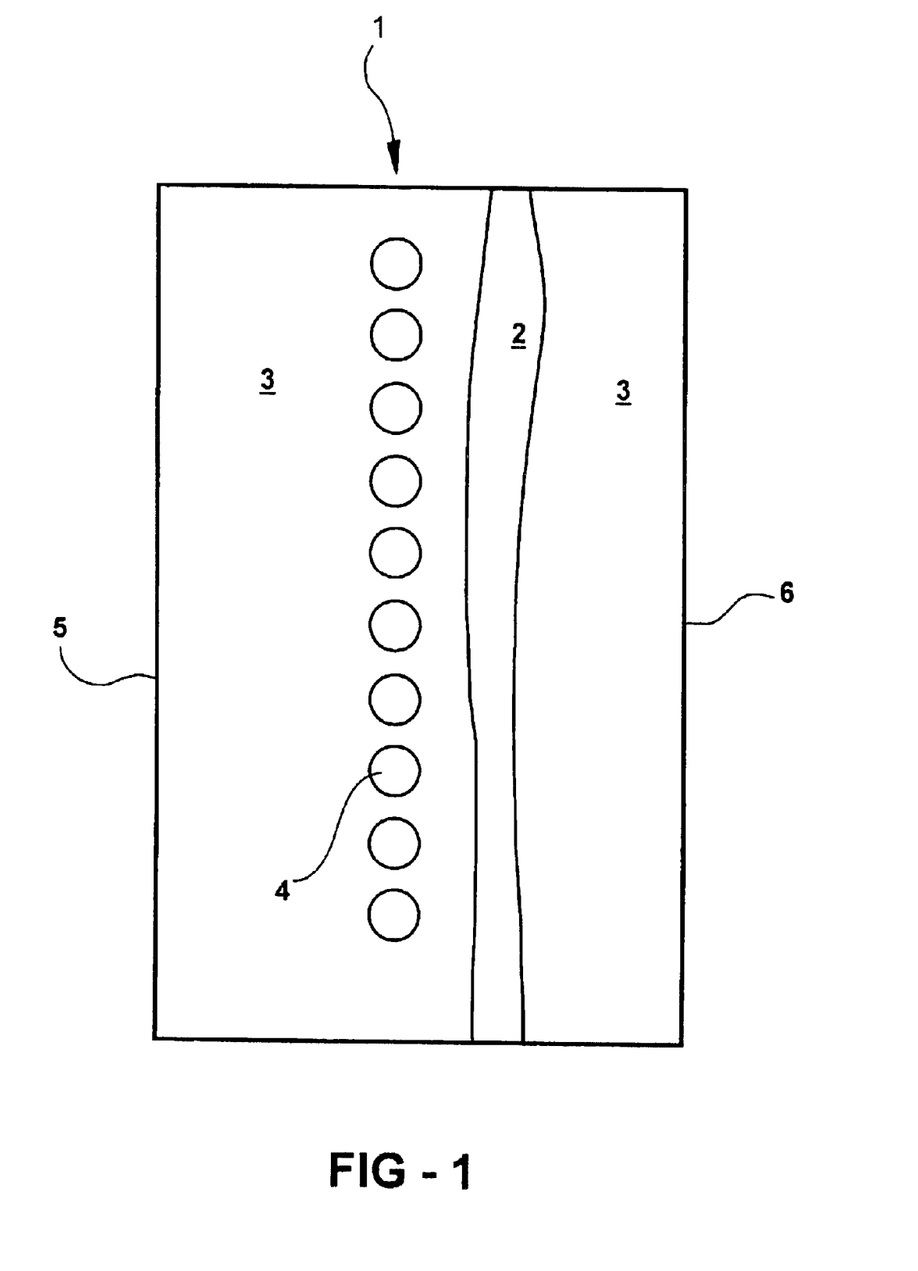
FIG. 1 is a stylized schematic depiction of a fuel cell anode used in the fuel cells of the instant invention.

FIG. 1 is a stylized schematic depiction of a fuel cell storage anode 1. The anode body includes a hydrophobic component 2 (such as polytetrafluoroethylene (PTFE)), a composite hydrogen storage material/catalytically active material component 3. While FIG. 1 shows the hydrophobic component 2 and the active electrode composite material component 3 as separate layers of material within the anode 1, they may also be intimately mixed into a single material. The anode 1, also includes a substrate component 4, which minimally acts as a current collector, but may also provide a support function. This substrate component is discussed herein below.

The anode 1 has two surfaces 5, 6. One surface 5 is adjacent a reactant (i.e. hydrogen or oxygen) inlet mechanism when incorporated into the fuel cell, while the other surface 6 is adjacent to the aqueous alkaline electrolyte. As stated above, the hydrophobic (PTFE) component 2 is either a layer within the anode or is intimately mixed with the anode material 3. In either case, the purpose of the hydrophobic (PTFE) material is to act as a water barrier, preventing water from escaping from the aqueous alkaline electrolyte of the fuel cell, while at the same time, allowing hydrogen to pass from the source thereof to the electrode material. Thus, a portion of the anode, surface 6 (and somewhat interiorly from the surface,) is in contact with the electrolyte and acts to oxidize hydrogen (providing electrons), while the remainder of the anode material (including surface 5) provides for dissociation of molecular hydrogen and storage of the dissociated hydrogen for later oxidation at surface 6.

The inventive anode active material 3 of the instant invention employs the hydrogen storage composite of the instant invention. The preferable hydrogen storage alloy is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metallic alloys, zirconium and/or titanium alloys or mixtures thereof. The anode material may even be layered such that the material on the hydrogen input surface 5 is formed from a material which has been specifically designed to be highly catalytic to the dissociation of molecular hydrogen into atomic hydrogen, while the material on electrolyte interface surface 6 is designed to be highly catalytic to the formation of water from hydrogen and hydroxyl ions.

The instant inventors have found that certain hydrogen storage materials are exceptionally useful as alkaline fuel cell anode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the anode; 2) as a water formation catalyst, forming water from hydrogen and hydroxyl ions (from the aqueous alkaline electrolyte) at surface 6 of the anode; and 3) as a an internal hydrogen storage buffer to insure that a ready supply of hydrogen ions is always available at surface 6 (this capability is useful in situations such as fuel cell startup and regenerative energy recapture, discussed herein below).

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloy of the '591 patent provides powder particles having an enriched Ni surface. The most preferred alloys having enriched Ni regions are alloys having the following composition:

(Base Alloy) $_a Co_b Mn_c Fe_d Sn_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

The substrate component 4 acts as an electrical conductor and may also act as a support means. For example, if a powdered electrically conductive material, such as nickel, nickel alloy, copper, copper alloy or carbon, is mixed into the active material 3 then the material acts as an electrically conductive materials, but does not provide any support for the electrode materials per se.

It is preferable that the substrate component act as both an electrical conductor and a support structure. The electrode may be formed by pressing active material into a porous metal substrate. The conductivity of the electrode can be increased by increasing the conductivity of the electrode's porous metal substrate. Generally the porous metal substrate includes, but is not limited to, meshes, grid, matte, foil, foam, plate, and expanded metal. Preferably, the porous metal substrate used for the electrode is a mesh, grid, foam, or expanded metal. The substrate may be formed from any material which is electrically conductive and resistant to corrosion or chemical attack by the electrolyte. Nickel or nickel alloy is a very good material, but for high power applications it may be too resistive. Thus when high power is required, the substrate is formed from copper, copper-plated nickel, or a copper-nickel alloy, as taught by U.S. Pat. No. 5,856,047 (Venkatesan, et al.) and U.S. Pat. No. 5,851,698 (Reichman et al.), the disclosures of which are hereby incorporated by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the anode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the anode manufacturing process.

The cathode contains an active material component which is catalytic to the dissociation of molecular oxygen into atomic oxygen, catalytic to the formation of hydroxyl ions ($OH^-$) from water and oxygen ions, corrosion resistant to the electrolyte, and resistant to poisoning. A material which is useful as an active material in the cathode is on in which a host matrix including at least one transition metal element which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, C, and O structurally modify the local chemical environments of the host matrix including one or more transition elements such as Mn, Co and Ni to form the catalytic materials of the cathode. These low over-voltage, catalytic materials increase operating efficiencies of the fuel cells in which they are employed.

The cathode is formed the same as conventional cathodes which use platinum catalysts, but the non-noble-metal catalysts described above are substituted for the platinum. The non-noble catalysts are finely divided and disbursed throughout a porous carbon matte-like material. The material may or may not have a conductive substrate as needed. If used the substrate can be as described herein above.

When the instant fuel cells is run in reverse, as an electrolyzer, during an energy recapture process such as regenerative braking, water is electrolyzed into hydrogen and oxygen. That is, when electric powered vehicles are used in stop and go mode in inner cities, regenerative braking systems can recapture kinetic energy, and convert it to electrical energy. In this mode, the electric motors reverse their roles and become generators using up the kinetic energy of the motion. This causes a spike of current which amounts to about 10% of the normal operating load. A conventional fuel cell (alkaline or PEM) cannot accept such surges. This feedback of energy would cause rapid hydrogen and oxygen evolution which would cause the catalysts to lose their integrity and adhesion thereby undermining the overall system performance.

In the inventive fuel cell, this will not be a problem, because the hydrogen storage anode will take the surge current and become charged with the produced hydrogen. However, the oxygen reduction electrode will evolve oxygen. While this will be less of a problem with the Ovonic non-noble-metal catalyst electrodes, the problem will nevertheless exist. Two alternative solutions to this problem may be employed to alleviate this problem. The first is to provide a third electrode, in parallel with the cathode, that will take the surges of current, harmlessly evolving oxygen. This electrode will need to be of high surface area, but need not necessarily be porous. Since this third electrode is the one that evolves oxygen, there is no longer any worry about oxidizing the carbon matte in the fuel cell's oxygen electrode. The second option is to provide an Ovonic oxygen evolution catalyst coating on the edges or frame of the current collector or substrate of the cathode. This catalyst will have a more favorable oxygen overvoltage when compared to the non-noble metal containing carbon substrate used for oxygen evolution. As a result, when there is a surge of current, the oxygen evolution will preferentially take place on the catalyst coated frame thus sparing the oxygen reduction (cathode) electrode from evolving oxygen. Also the oxygen reduction catalyst can be tailored not to be an oxygen evolution catalyst.

It should be noted that the anode and cathode active materials of the instant invention are very poisoning resistant. This is true because the increased number of catalytically active sites of these materials not only increases catalytic activity, but enables the materials to be more resistant to poisoning, because with materials of the present invention a certain number of catalytically active sites can be sacrificed to the effects of poisonous species while a large number of non-poisoned sites still remain active to provide the desired catalysis. Also, some of the poisons are inactivated by being bonded to other sites without effecting the active sites.

Figure 2:
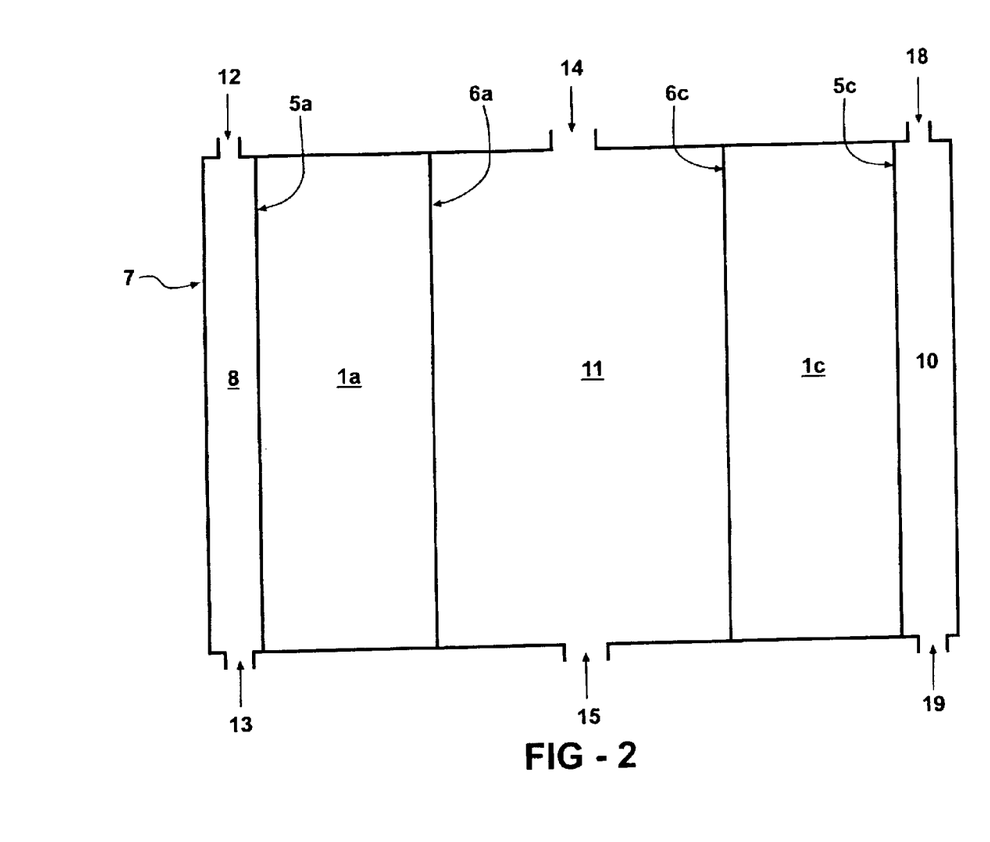
FIG. 2 is a stylized schematic depiction of the instant startup alkaline fuel cell of the instant invention.

FIG. 2 is a stylized schematic depiction of an alkaline fuel cell 7 incorporating the electrodes 1 ("a" designates anode and "c" designates cathode) of the instant invention. The fuel cell 7 consists of three general sections: 1) an anode section, which includes the anode 1$a$ and a hydrogen supply compartment 8; 2) the electrolyte compartment 11; and 3) the cathode section, which includes the cathode 1$c$ and the oxygen (air) supply compartment 10.

In the anode section, hydrogen or hydrogen containing gas mixtures is supplied under pressure to the hydrogen supply compartment 8 through hydrogen inlet 12. Hydrogen is then absorbed through surface 5$a$ into the anode 1$a$. The absorbed hydrogen is catalytically broken down by the anode active material into atomic hydrogen which is stored in the hydrogen storage material as a hydride, and then finally reacts at surface 6$a$ with hydroxyl ions to form water. It should be noted that the heat of hydride formation helps to warm the fuel cell to it's optimal operating temperature. Any unabsorbed hydrogen and other contaminant gases or water vapor in the hydrogen supply are vented through outlet 13. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 11 holds (in this specific example) an aqueous alkaline electrolyte in intimate contact with the anode 1a and the cathode 1c. The alkaline solution is well known in the art and is typically a potassium hydroxide solution. The electrolyte provides hydroxyl ions which react with hydrogen ions at surface 6a of the anode 1a and water molecules which react with oxygen ions at surface 6c of the cathode 1c. The electrolyte is circulated through compartment 11 via inlet 14 and outlet 15 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any loses due to evaporation of water through the electrodes. Systems for conditioning the fuel cell electrolyte are well known in the art and need not be further described in detail herein.

In the cathode section, oxygen, air, or some other oxygen containing gaseous mixture is supplied to the oxygen supply compartment 10 through oxygen inlet 18. Oxygen is then absorbed through surface 5c into the cathode 1c. The absorbed oxygen is catalytically broken down by the cathode active material into ionic oxygen, which finally reacts at surface 6c with water molecules to form hydroxyl ions. Any unabsorbed oxygen and other gases in the feed (e.g. nitrogen, carbon dioxide, etc.) or water vapor in the oxygen supply are vented through outlet 19.

EXAMPLE

An experiment was performed to prove the concept underlying the use of metal hydride storage materials within the anode of an alkaline fuel cell. It was not the intent of this experiment to obtain quantitative data but to show that the material works as predicted. A simple lab scale set up was used for this purpose. The fuel cell was assembled utilizing a commercially available Pt-based air electrode and pre-etched negative electrode (nickel, expanded metal substrate) with MF139.12 alloy (nominal composition 9.0 at. % Ti, 5.0 at. % V, 26.2 at. % Zr, 38.0 at. % Ni, 3.5 at.% Cr, 15.6 at. % Mn, 0.8 at. % Sn, 1.5 at. % Co, and 0.4 at. % Al). The anode and cathode were separated by a separator (non-woven polypropylene matte, surface grafted with hydrophilic materials, density 30 g/m$^2$), soaked in KOH electrolyte (aqueous solution of 30 wt % KOH, 1.5 wt % LiOH) and finally placed into the test cell.

Tests were run with and without additional hydrogen flow into the anode. The anode (metal hydride electrode) was first charged with hydrogen and air was admitted into the cathode. Once a steady state open circuit potential was reached, the cell was forcibly discharged at a fixed current using a power supply. The cell potential and the half-cell potential of the anode and the cathode were measured using a standard Hg/HgO reference electrode. Once steady state potential was reached in each case, the discharge current was changed and once again the measurement continued. The discharge current was varied over a wide range and the process repeated.

These measurements were first performed without a flow of additional hydrogen and thereafter with additional hydrogen flow. The potential drop (DV) or polarization was measured for every current variation (DI) and the values plotted. This potential drop is the sum total of all of the polarization factors that are involved. By keeping most of the parameters constant, the relative difference in the electrode behavior with and without the additional hydrogen flow could be assessed.

Figure 3:
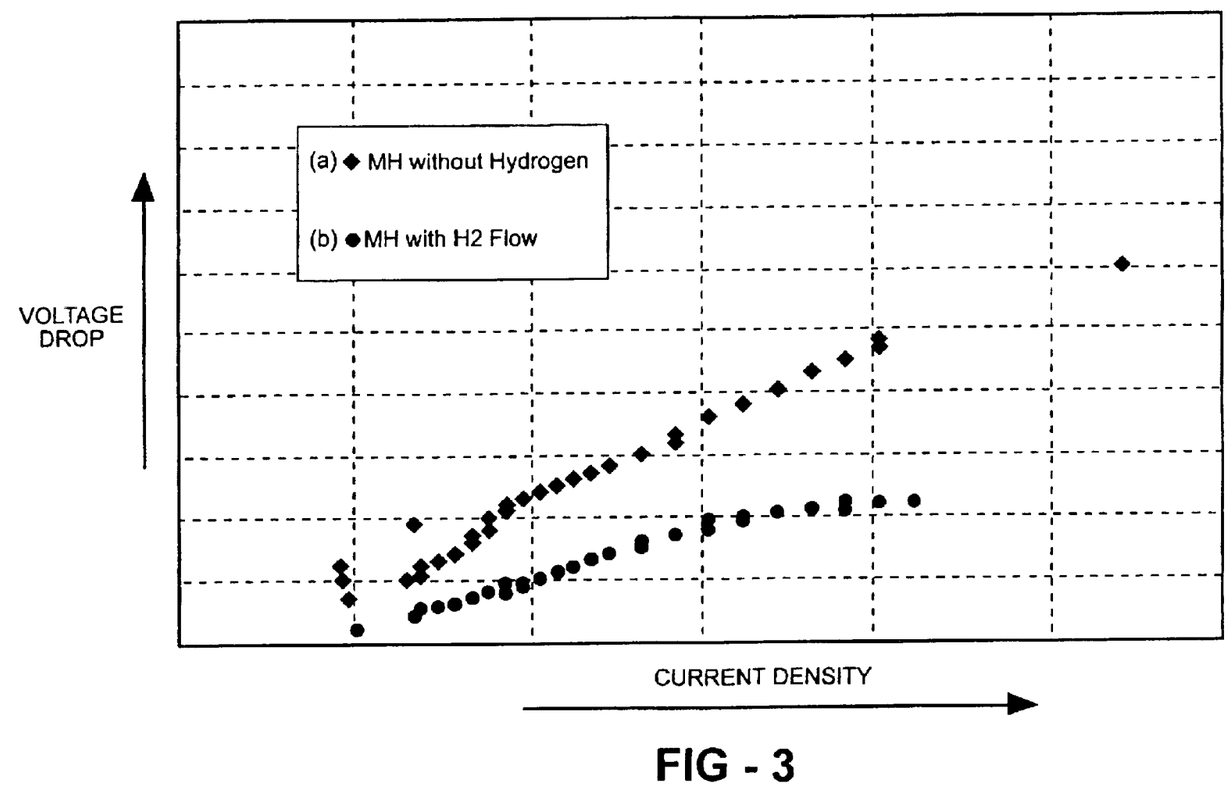
FIG. 3 is a plot of the potential drop (DV) versus current for a fuel cell using a hydrogen storage active material, specifically shown is the performance in instant startup mode, without hydrogen flow (curve a) and in normal operation mode when hydrogen is flowing (curve b)

FIG. 3 shows the potential drop (DV) vs. current. Even without hydrogen flow (curve a), the hydride electrode is able to sustain significant discharge current because it is already charged. In this mode, the fuel cell demonstrates its inherent hydrogen storage capacity, thus providing an for an instant startup fuel cell. As the discharge current increases the polarization increases because the hydride electrode is becoming depleted of hydrogen. In contrast, when hydrogen is flowing (curve b), the polarization is lower because there is a continuous supply of gaseous hydrogen being transformed into metal hydride to power the fuel cell. The polarization value also reaches a steady state value because the rate of electrochemical hydrogen consumption is matched by the rate of gaseous hydrogen dissociation from the gas phase (i.e. normal fuel cell operation mode).

Figure 4:
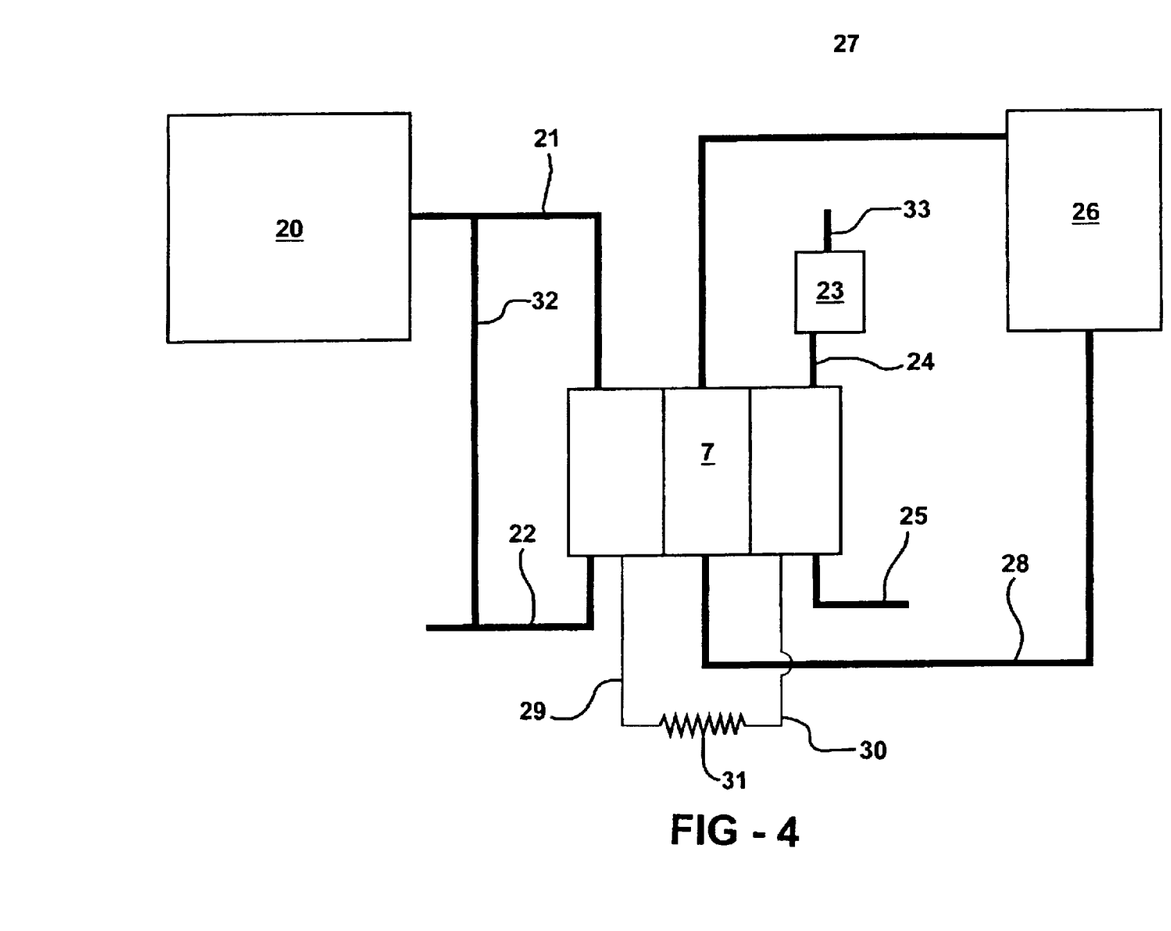
FIG. 4 is a stylized schematic depiction of an energy supply system incorporating the instant startup alkaline fuel cell of the instant invention.

FIG. 4 is a stylized schematic depiction of an energy supply system incorporating the alkaline fuel cell 7 of the instant invention. The energy supply system also includes a source of hydrogen 20. The source may be of any known type, such as a hydride bed storage system, a compressed hydrogen storage tank, a liquid hydrogen storage tank, or a hydrocarbon fuel reformer. The preferred source is a metal hydride storage system. The hydrogen from the source 20 is transported to the fuel cell 7 via input line 21, and excess gases are vented through output line 22. A portion of the gases from output line 22 may be recycled to input line 21 through recycle line 32. The energy supply system also includes a source of oxygen, which is preferably air for economic reasons. The air is drawn into line 33 and then can be passed through a carbon dioxide scrubber 23. The air is then transported to the fuel cell 7 via input line 24. Excess air and unused gases are vented through output line 25. Since this gas stream contains no harmful gases, it may be vented to the environment directly.

The energy supply system also includes an electrolyte recirculation system. The electrolyte from the fuel cell 7 is removed through output line 28 and sent to an electrolyte conditioner 26. The electrolyte conditioner 26 heats or cools the electrolyte as needed and removes/adds water as necessary. The conditioned electrolyte is then returned to the fuel cell 7 via input line 27.

Finally the energy supply system includes electrical leads 29 and 30 which supply electricity from the fuel cell 7 to a load 31. The load can be any device requiring power, but particularly contemplated is the power and drive systems of an automobile.

The instant fuel cell and energy supply systems incorporating it are particularly useful for applications in which instant start and energy recapture are requirements thereof, such as for example in powering a vehicle. For instance, in consumer vehicle use, a fuel cell that has the built in hydrogen storage of the instant invention has the advantage of being able to start producing energy instantly from the hydrogen stored in it's electrodes. Thus, there is no lag time while waiting for hydrogen to be supplied from external sources. Additionally, because hydrogen can be adsorbed and stored in the anode material of the fuel cell, energy recapture can be achieved as well. Therefore, activities such as regenerative braking, etc., can be performed without the need for an battery external to the fuel cell because any hydrogen produced by running the fuel cell in reverse will be stored in the electrodes of the fuel cell. Therefore, in essence, fuel cells employing the instant hydrogen storage materials are the equivalent of a fuel cell combined with a battery.

The drawings, discussion, descriptions, and examples of this specification are merely illustrative of particular embodiments of the invention and are not meant as limitations upon its practice. Also, while the instant invention is described in context to an alkaline fuel cell, it is readily apparent to one skilled in the art that the instant improvements may equally be applied to P.E.M. fuel cells. It is the appended claims, including all equivalents, that define the scope of the invention.

What is claimed is:

1. A composite hydrogen storage material comprising:
   1) an active material having hydrogen storage capacity; and
   2) a catalytic material having greater catalytic activity toward the dissociation of molecular hydrogen and/or oxidation of hydrogen than that of said active material having hydrogen storage capacity;
   said catalytic material being continually graded, from a high concentration on the surface of the composite to a lower concentration inward of the bulk of the composite, throughout at least a portion of said composite hydrogen storage material.

2. The composite hydrogen storage material according to claim 1, wherein said catalytic material is continually graded throughout all of said composite hydrogen storage material.

3. The composite hydrogen storage material of claim 1, wherein said catalytic material comprises a multicomponent compositionally disordered non-equilibrium catalytic material including a host matrix having at least one transition element and having incorporated therein one or more modifier elements, said modifier element modifying the local structural chemical environments of said material to provide said disorder, said material including means for creating an increased density of catalytically active sites for the dissociation of molecular hydrogen and/or oxidation of hydrogen.

4. The composite hydrogen storage material of claim 3, wherein said means include a plurality of chemical elements for providing a large number of catalytically active sites.

5. The composite hydrogen storage material of claim 3, wherein said means include means designed to provide local chemical environments which include sites for selectively inactivating poisonous species.

6. The composite hydrogen storage material of claim 3, wherein said means have non-equilibrium metastable phases and configurations.

7. The composite hydrogen storage material of claim 3, wherein said disordered material is a substantially polycrystalline multicomponent material lacking long range compositional order.

8. The composite hydrogen storage material of claim 3, wherein said disordered material is a substantially microcrystalline material.

9. The composite hydrogen storage material of claim 3, wherein said disordered material is a mixture of polycrystalline or microcrystalline phase regions and amorphous phase regions.

10. The composite hydrogen storage material of claim 3, wherein said disordered material is an amorphous material containing at least one amorphous phase.

11. The composite hydrogen storage material of claim 3, wherein said disordered material is a mixture of microcrystalline and polycrystalline phases.

12. The composite hydrogen storage material of claim 1, wherein said hydrogen storage material forms the bulk of said composite hydrogen storage material and said catalytic material is deposited in a layer onto at least one surface of said hydrogen storage material.

13. The composite hydrogen storage material of claim 12, wherein the greatest concentration of catalytic material is at the exterior surface of said layer.

14. The composite hydrogen storage material of claim 1, wherein said composite hydrogen storage material is formed from hydrogen storage material which is in the form of particulate material onto which a said catalytic material is deposited.

15. The composite hydrogen storage material of claim 14, wherein the greatest concentration of said catalytic material is at the exterior surface of said composite hydrogen storage material.

16. The composite hydrogen storage material of claim 3, wherein said host matrix includes Ni.

17. The composite hydrogen storage material of claim 16, wherein said modifier element is a transition element.

18. The composite hydrogen storage material of claim 17, wherein said modifier element is selected from the group consisting of Ti, Zr, Mo, V, Mg, Si and Al.

19. The composite hydrogen storage material of claim 18, wherein said catalytic material is a Ni-Ti-Mo alloy.

20. In a fuel cell, an anode including a composite hydrogen storage material comprising:
   1) an active material having hydrogen storage capacity; and
   2) a catalytic material having greater catalytic activity toward the dissociation of molecular hydrogen and/or oxidation of hydrogen than that of said active material having hydrogen storage capacity;
   said catalytic material being continually graded from a high concentration on the surface of the composite to a lower concentration inward of the bulk of the composite, throughout at least a portion of said composite hydrogen storage material.

21. The fuel cell of claim 20, wherein said catalytic material is continually graded throughout all of said composite hydrogen storage material.

22. The fuel cell of claim 20, wherein said catalytic material comprises a multicomponent compositionally disordered non-equilibrium catalytic material including a host matrix having at least one transition element and having incorporated therein one or more modifier elements, said modifier element modifying the local structural chemical environments of said material to provide said disorder, said material including means for creating an increased density of catalytically active sites for the dissociation of molecular hydrogen and/or oxidation of hydrogen.

23. The fuel cell of claim 22, wherein said means include a plurality of chemical elements for providing a large number of catalytically active sites.

24. The fuel cell of claim 22, wherein said means include means designed to provide local chemical environments which include sites for selectively inactivating poisonous species.

25. The fuel cell of claim 22, wherein said means has non-equilibrium metastable phases and configurations.

26. The fuel cell of claim 22, wherein said disordered material is a substantially polycrystalline multicomponent material lacking long range compositional order.

27. The fuel cell of claim 22, wherein said disordered material is a substantially microcrystalline material.

28. The fuel cell of claim 22, wherein said disordered material is a mixture of polycrystalline or microcrystalline phase regions and amorphous phase regions.

29. The fuel cell of claim 22, wherein said disordered material is an amorphous material containing at least one amorphous phase.

30. The fuel cell of claim 22, wherein said disordered material is a mixture of microcrystalline and polycrystalline phases.

31. The fuel cell of claim 20, wherein said hydrogen storage material forms the bulk of said composite hydrogen storage material and said catalytic material is deposited in a layer onto at least one surface of said hydrogen storage material.

32. The fuel cell of claim 31, wherein the greatest concentration of catalytic material is at the exterior surface of said layer.

33. The fuel cell of claim 20, wherein said composite hydrogen storage material is formed from hydrogen storage material which is in the form of particulate material onto which a said catalytic material is deposited.

34. The fuel cell of claim 33, wherein the greatest concentration of said catalytic material is at the exterior surface of said composite hydrogen storage material.

35. The fuel cell of claim 22, wherein said host matrix includes Ni.

36. The fuel cell of claim 35, wherein said modifier element is a transition element.

37. The fuel cell of claim 36, wherein said modifier element is selected from the group consisting of Ti, Zr, Mo, V, Mg, Si and Al.

38. The fuel cell of claim 37, wherein said catalytic material is a Ni—Ti—Mo alloy.

39. The fuel cell of claim 20, wherein said hydrogen storage capacity provides said fuel cell with instant startup capability.

40. The fuel cell of claim 20, wherein said hydrogen storage capacity provides said fuel cell with the ability to accept recaptured energy by running in reverse as an electrolyzer.

41. The fuel cell of claim 20, wherein said hydrogen storage capacity provides thermal energy to said fuel cell via the heat of formation of the hydride thereof.

42. The fuel cell of claim 20, wherein said material having hydrogen storage capacity does not include noble metal catalysts.

43. The fuel cell of claim 42, wherein said material having hydrogen storage capacity is resistant to poisoning.

44. The fuel cell of claim 42, wherein said material having hydrogen storage capacity is a hydrogen storage alloy selected from the group consisting of rare-earth/Misch metal alloys, zirconium alloys, titanium alloys, and mixtures or alloys thereof.

45. The fuel cell of claim 44, wherein said hydrogen storage alloy has the following composition:

(Base Alloy) $_a Co_b Mn_c Fe_d Sn_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

46. The fuel cell of claim 20, wherein said anode further includes a hydrophobic component.

47. The fuel cell of claim 46, wherein said hydrophobic component is polytetrafluoroethylene (PTFE).

48. The fuel cell of claim 47, wherein said PTFE is intimately mixed with said composite hydrogen storage material.

49. The fuel cell of claim 47, wherein said PTFE is a layer within said anode.

50. The fuel cell of claim 20, wherein said anode additionally includes a substrate component which provides only for electrical conductivity and comprises an electrically conductive powder intimately mixed with said composite hydrogen storage material.

51. The fuel cell of claim 50, wherein said electrically conductive powder comprises at least one material selected from the group consisting of copper, a copper alloy, nickel, a nickel alloy, and carbon.

52. The fuel cell of claim 20, wherein said anode additionally includes a substrate component which provides for both electrical conductivity and mechanical support and comprises an electrically conductive mesh, grid, foam, matte, foil, foam, plate, or expanded metal.

53. The fuel cell of claim 52, wherein said substrate component comprises an electrically conductive a mesh, grid, foam, or expanded metal.

54. The fuel cell of claim 53, wherein said mesh, grid, foam, or expanded metal is formed from nickel or nickel alloy.

55. The fuel cell of claim 53, wherein said mesh, grid, foam, or expanded metal is formed from copper, copper plated nickel or a copper-nickel alloy.

56. The fuel cell of claim 20, wherein fuel cell further includes a cathode which comprises:
   a) a hydrophobic component for preventing water from passing through said cathode;
   b) a substrate component providing for mechanical support and/or current collection; and
   c) a cathode active material.

57. The fuel cell of claim 56, wherein said cathode active material is resistant to poisoning.

58. The fuel cell of claim 57, wherein said cathode active material comprises a host matrix including at least one transition metal element which is structurally modified by the incorporation of at least one modifier element to enhance its catalytic properties.

59. The fuel cell of claim 58, wherein said cathode active material comprises a host matrix which includes one or more transition elements from the group consisting of Mn, Co and Ni and at lease one modifier element selected from the group consisting of La, Al, K, Cs, Na, Li, C, and O which structurally modifies the local chemical environments of said host matrix.

60. The fuel cell of claim 56, wherein said cathode also includes an oxygen evolution catalyst coating on the edges or frame of the current collector or substrate of the cathode.

61. The fuel cell of claim 56, wherein said fuel cell further includes a third, oxygen evolution, electrode, in parallel with said cathode, that takes surges of current during energy recapture, thereby harmlessly evolving oxygen.

* * * * *